Patented Aug. 30, 1949

2,480,326

UNITED STATES PATENT OFFICE 2,480,326

ETHERS AND PROCESS FOR THE MANUFACTURE OF SAME

Nathan Chadwick Hindley and John Alexander Low, Herts, England, assignors to Hoffmann-La Roche Inc., Nutley, N. J., a corporation of New Jersey No Drawing. Application March 1, 1946, Serial No. 651,440. In Great Britain March 8, 1945

10 Claims. (Cl. 260—251)

This invention relates to the manufacture of ethers from primary amino compounds.

It is known that alkyl nitrites may be used for the diazotisation of aromatic amines by the well-known Knoevenagel method (Berichte der Deutschen Chemischen Gesellschaft, vol. 23, year 1890, p. 2995) or in the formation of diazotates according to Bamberger and Rüst (Berichte der Deutschen Chemischen Gesellschaft, vol. 33, year 1900, p. 3511). Similarly, aliphatic primary amines are found to give diazo-hydrocarbons working in an alkaline medium (Bamberger, loc. cit.). It is therefore an entirely surprising discovery that primary amino compounds, in general, are found to lead to the production of ethers on treatment with alkyl or substituted alkyl nitrites.

According to the process of the present invention, ethers of the type R'OR, in which R' represents an alkyl, substituted alkyl, aryl or a heterocyclic group and R represents an alkyl or substituted alkyl group, are produced by treating a nitrite of the type R.ONO with the salt of a primary base of the type R'NH₂.

The salt may for convenience be the hydrochloride or sulfate. In certain cases the salt of the base can be formed in situ by mixing equimolecular proportions of the amino compound and alkyl or substituted alkyl nitrite and an acid such as hydrochloric acid. It is preferable to work in the presence of the corresponding alcohol ROH, using this for example as a solvent for the reaction. Anhydrous conditions are preferred initially. The temperature of the reaction may vary from room temperature to the highest that can be employed without effecting decomposition of the reactants. It may be necessary in certain cases to work under pressure where, for example, the boiling point of one of the reactants is lower than the preferred reaction temperature.

The process is particularly valuable for the production of ethers of pharmaceutical importance. Thus, by the use of the calculated quantity of alkyl nitrite, 2-methyl-4-amino-5-aminomethyl pyrimidine may be converted into the corresponding 5-alkoxymethyl compound of considerable interest in the manufacture of substances having the biological activity of vitamin $B_1$.

The following examples, in which the parts are by weight, illustrate how the process of the invention may be carried into effect.

Example 1

143.5 parts of benzylamine hydrochloride are dissolved in 1000 parts of absolute ethyl alcohol and 91 parts of ethyl nitrite are added. Alternatively, the same amount of ethyl nitrite may be added as a solution in absolute ethyl alcohol and a correspondingly smaller amount of alcohol used to dissolve the benzylamine hydrochloride. The mixture is heated in a closed vessel to about 90–100° C. for two hours, after which the reaction vessel is cooled down, the nitrogen produced by the reaction blown off and the vessel opened and its contents removed. The solvent is removed by distillation and the residue from which some unchanged benzylamine hydrochloride crystallises, taken up in water and extracted with ether. After removing the solvent from the ether extract and distilling in vacuo benzyl ethyl ether of B. Pt. 185° C. is obtained in good yield. The unchanged benzylamine hydrochloride may be recovered from the aqueous portion remaining after the ether extraction by methods well known to those skilled in the art, and used again.

Example 2

229 parts of 2-methyl-4-amino-5-aminomethyl pyrimidine dihydrochloride monohydrate (or 211 parts of the corresponding anhydrous salt) are suspended in 1000 parts of absolute ethyl alcohol and 91 parts of ethyl nitrite are added. The reaction mixture is heated in a closed vessel to 90–100° C. for two hours. The cooled product is removed from the vessel and the solvent removed by distillation. The residue is dissolved in water, made strongly alkaline with potassium carbonate, and extracted several times with chloroform. The chloroform extract is separated, dried over anhydrous potassium carbonate and distilled at atmospheric pressure to remove solvent, the last traces being removed by distilling in vacuo at room temperature. The residual material consisting largely of 2-methyl-4-amino-5-ethoxymethyl pyrimidine is distilled in a high vacuum when the desired material distills practically pure at 105° C./0.5 mm. as a colorless liquid solidifying to white crystals. The 2-methyl-4-amino-5-ethoxymethyl pyrimidine may be recrystallised from light petroleum, or carbon tetrachloride and then melts at 88–90° C. The yield is greater than 80% of the theoretical.

Example 3

13 parts of benzyl nitrite are dissolved in 200 parts of benzyl alcohol and 20 parts of 2-methyl-4-amino-5-aminomethyl pyrimidine dihydrochloride are suspended in the resultant solution.

The mixture is heated at 100° C. for 24 hours with good stirring, after which it is cooled, poured into dilute hydrochloric acid and extracted with chloroform to remove benzyl alcohol. The aqueous portion is then saturated with potassium carbonate and extracted with chloroform. The solvent is removed from the dried extract and the residue distilled in vacuo, when 2-methyl-4-amino-5-benzyl-oxymethyl pyrimidine is obtained, of B. Pt. 160–162° C./0.1 mm. and solidifies to white crystals, of M. Pt. 217° C.

Example 4

20 parts of 2-methyl-4-amino-5-aminomethyl pyrimidine dihydrochloride are suspended in a mixture of 180 parts of amyl alcohol and 11.7 parts of amyl-nitrite and the mixture heated in an autoclave for 1 hour at 95–105° C. At the end of this time the autoclave is cooled, the nitrogen produced in the reaction blown off and the contents of the autoclave removed. After filtering off unchanged pyrimidine diamine dihydrochloride the amyl alcohol is removed by distillation in vacuo and the residue taken up in water; the resultant solution is saturated with potassium carbonate and extracted repeatedly with chloroform. The residue obtained by removing chloroform from the dried extract is sublimed in vacuo and then forms white crystals of 2-methyl-4-amino-5-amyloxymethyl pyrimidine, of M. Pt. 69° C.

Example 5

20 parts of aniline hydrochloride and 11.6 parts of ethyl nitrite are dissolved in 200 parts of absolute ethyl alcohol and heated for 1 hour at 95–100° C. as in Example 4. The alcohol is distilled from the product at atmospheric pressure and the residue suspended in 20 parts of water and extracted several times with ether. The ether extract is dried over anhydrous potassium carbonate, filtered, and the ether removed by distillation. The crude product so obtained is a black oil, which on distillation gives a fraction boiling between 171 and 172° C. at atmospheric pressure, consisting of almost pure phenyl ethyl ether.

Example 6

8.3 parts of methyl nitrite and 20 parts of β-naphthylamine hydrochloride are dissolved in 145 parts of methyl alcohol and heated in an autoclave for 1 hour at 100° C. as in Example 4. The alcohol is removed from the reaction product and the residue taken up in water and extracted repeatedly with chloroform. After removal of the solvent from the dried extract the residue is distilled in vacuo, the portion of B. Pt. 107–110° C./2.5 mm., consisting of almost pure β-methyl-naphthyl ether.

Example 7

20 parts of 1-diethylamino-4-amino-pentane dihydrochloride and 6.5 parts of ethyl nitrite are dissolved in 175 parts of absolute ethyl alcohol and heated in an autoclave, as in Example 4, for 1 hour at 95–100° C. The alcohol is removed from the reaction product by distillation in vacuo, the deliquescent crystalline residue being taken up in water and made alkaline with sodium carbonate. The oil which separates out is removed, dissolved in ether and dried over anhydrous potassium carbonate. After filtering the ether solution the solvent is removed by distillation and the residue distilled, the fraction, of B. Pt. 170–175° C. at atmospheric pressure, consisting of fairly pure 1-diethylamino-4-ethoxy-pentane.

Example 8

20 parts of cyclohexylamine hydrochloride and 11.9 parts of ethyl nitrite are dissolved in 180 parts of absolute ethyl alcohol and heated in an autoclave, as in Example 4, for 1 hour at 95–105° C. After removal of the alcohol from the reaction product by distillation the residue is taken up in water and extracted with ether, while the alcoholic distillate is fractionated using an efficient column. The residue from the removal of ether from the ether extract is added to the residue from the refractionation of the alcohol and the mixture distilled at atmospheric pressure. The material boiling between 70° C. and 160° C. is collected, washed with water, and then distilled and gives cyclohexyl ethyl ether as a colorless oil boiling at 145–150° C. at atmospheric pressure.

Example 9

9.5 parts of 2-aminopyridine, 3.65 parts of anhydrous hydrogen chloride, and 7.45 parts of ethyl nitrite are dissolved in 160 parts of absolute ethyl alcohol and reacted in an autoclave, as in Example 4, for 1 hour at 90–100° C. The alcohol is removed from the reaction product by distillation, the residue is taken up in water and the resulting solution saturated with sodium carbonate, and repeatedly extracted with chloroform. After removal of the chloroform from the extract the residue is distilled in vacuo, the fraction, of B. Pt. 75–90° C./15 mm., consisting of nearly pure 2-ethoxypyridine is collected.

Example 10

12.8 parts of β-alanine hydrochloride and 7.4 parts of ethyl nitrite are dissolved in 180 parts of absolute ethyl alcohol and heated to 95–105° C. as in Example 4. The alcohol is evaporated from the reaction product and the residue taken up in water, the solution made slightly acid with hydrochloric acid and extracted repeatedly with ether. The ether extract is washed with a little sodium bicarbonate solution to remove small amounts of acid and then dried over anhydrous sodium sulfate. After filtering the dried extract and removing ether the residue is distilled at atmospheric pressure and gives a fraction boiling at 168–175° C. consisting of ethyl-β-ethoxy propionic acid.

We claim:

1. A process for the manufacture of ethers which comprises reacting an aliphatic nitrite with a salt of a primary amine in the presence of an alcohol at an elevated temperature.

2. A process as in claim 1 wherein the salt of the primary amine is a hydrochloride.

3. A process as in claim 1 wherein the salt of the primary amine is a sulfate.

4. A process as in claim 1 in which the reaction is carried out under initially anhydrous conditions.

5. A process as in claim 1 in which the corresponding alcohol of the nitrite is employed.

6. The process of reacting 2-methyl-4-amino-5-aminomethyl-pyrimidine dihydrochloride with an aliphatic nitrite in the presence of an alcohol as a solvent and at an elevated temperature to form 2-methyl-4-amino-5-alkoxymethyl-pyrimidine.

7. The process as in claim 6 in which the corresponding alcohol of the nitrite is employed as a solvent.

8. The process of reacting 2-aminopyridine in salt form with an aliphatic nitrite in the presence of an alcohol as a solvent and at an elevated temperature to form a 2-alkoxy-pyridine.

9. The process of reacting $\beta$-alanine in salt form with ethyl nitrite in the presence of ethyl alcohol and at an elevated temperature to form ethyl-$\beta$-ethoxy propionic acid.

10. A process as in claim 1 wherein the salt of the primary amine is formed in situ by treating the primary amine with an acid in the presence of the aliphatic nitrite.

NATHAN CHADWICK HINDLEY.
JOHN ALEXANDER LOW.

REFERENCES CITED

The following references are of record in the file of this patent:

Hantzsch et al., "Berichte Deutsche Chemische Gesellschaft," vol. 34, No. 3, pages 3337 to 3340 (1901).

Perkin & Kipping, "Organic Chemistry," part I, pages 413, 431 (1919).

Sadtler & Matos, "Industrial Organic Chemistry" 5th ed., 1923 pages 496, 500, 506.

Karrer "Organic Chemistry," translated by Mees, pages 431 to 437 (1938).